No. 716,712. Patented Dec. 23, 1902.
W. D. HOLLEY.
VEHICLE SEAT LOCK.
(Application filed May 10, 1902.)
(No Model.)
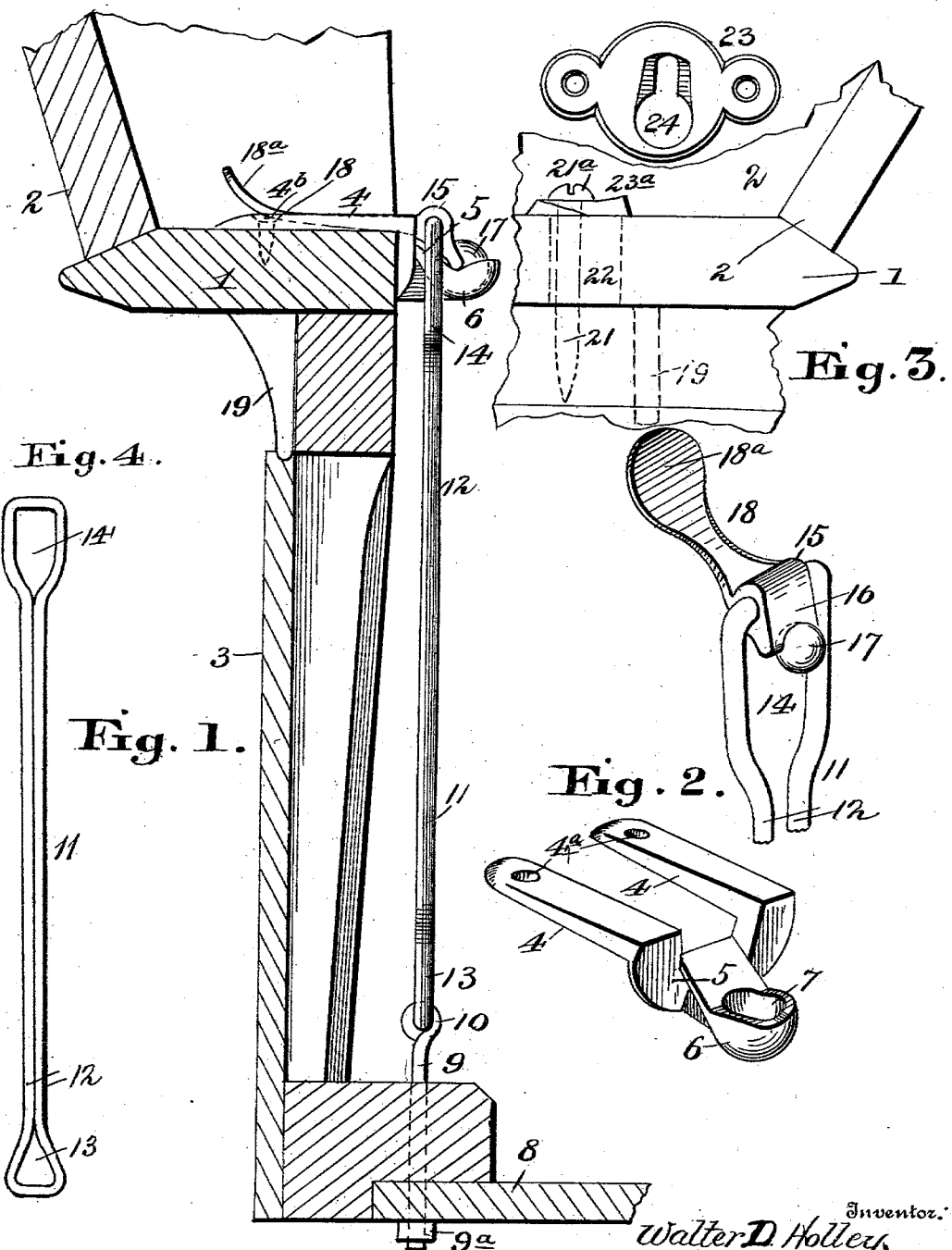
Witnesses:
Franck L. Ourand
Frank G. Radelfinger
Inventor:
Walter D. Holley,
By Louis Bagger & Co.
Attorneys

UNITED STATES PATENT OFFICE.

WALTER D. HOLLEY, OF BROOKVILLE, INDIANA, ASSIGNOR OF ONE-HALF TO JOHN A. FRIES, OF BROOKVILLE, INDIANA.

VEHICLE-SEAT LOCK.

SPECIFICATION forming part of Letters Patent No. 716,712, dated December 23, 1902.

Application filed May 10, 1902. Serial No. 106,799. (No model.)

*To all whom it may concern:*

Be it known that I, WALTER D. HOLLEY, a citizen of the United States, residing at Brookville, in the county of Franklin and State of Indiana, have invented new and useful Improvements in Vehicle-Seat Locks, of which the following is a specification.

My invention relates to vehicle-seat locks; and the object of the same is to construct a device of this character which will be simple in construction and efficient in operation.

The novel construction used by me in carrying out my invention is fully described in this specification and claimed, and illustrated in the accompanying drawings, forming a part thereof, in which—

Figure 1 is a transverse section of a seat with my device attached thereto and a fragment of the vehicle. Fig. 2 is a detail of the locking-lever and socket. Fig. 3 is a detail of the guide member and screw. Fig. 4 is a detail of the connecting-rod.

Like numerals of reference designate like parts in the different views of the drawings.

The numeral 1 designates a seat-bottom, and 2 the back thereof. The seat, as shown, is mounted on the side 3 of a vehicle and extends longitudinally thereof. Secured to the bottom 1 are parallel arms 4, connected by a downwardly-curved cross-bar 5, bearing a member 6, having a socket 7 formed therein, which member extends perpendicular to the edge of the seat-bottom 2 and below the plane of said bottom. The arms 4 are provided with apertures $4^a$ to accommodate screws $b^4$, which serve to secure the arms to the seat.

Seated in the bottom 8 of the vehicle is a bolt 9, secured by a nut $9^a$ and bearing an eye 10, to which is pivoted a connecting-rod 11. This connecting-rod is formed of two parallel members 12, united at their extremes and shaped to form eyes 13 and 14 on the lower and upper ends, respectively. An elbow locking-lever 15 is pivoted to the upper eye 14. The short arm 16 of this lever 15 bears a ball 17, constructed to fit the socket 7, and the long arm 18 thereof is curved up at $18^a$ to adapt it to be grasped by the fingers to disengage it.

To prevent the forward movement of the seat, a bracket-arm 19 is mounted thereon and located to engage the side 3 of the vehicle.

To give additional security to the seat, a screw 21, having a large head $21^a$, is seated in the side 3 in position to extend through an aperture 22 in the bottom 2 and engage guides $23^a$, formed on a guide member 23, mounted on the seat and having an aperture 24 therein larger than the screw-head $21^a$.

In placing the seat in position the screw 21 is first engaged in the guides $23^a$ with the bracket-arm 19 abutting the side 3. The connecting-rod 11 is then swung up into a vertical position and the eye 14 put over the socket member. The ball 17 is next engaged in the socket 7 and the long arm 18 of the lever turned down in contact with the seat 2 and extending between the arms 4, which hold it against sidewise movement. This will lock the seat firmly in place.

I do not wish to be limited as to details of construction, as these may be modified in many particulars without departing from the spirit of my invention.

Having described my invention, what I claim as new, and desire to secure by Letters Patent, is—

1. In a seat-lock, the combination of a member bearing a socket and having two parallel arms adapted to be secured to a seat, a bolt bearing an eye, a connecting-rod pivoted at one end to said eye and bearing an eye on its other end which is constructed to fit over said socket, an elbow-lever pivoted to the said eye on said connecting-rod, and having a ball on its short arm adapted to fit said socket, the long arm of said lever being constructed to lie between said arms and to be engaged by the fingers to disengage said lever and unlock the seat, substantially as described.

2. In a seat-lock, the combination of a socket member comprising a socket and two parallel arms constructed to be secured to a seat with the said socket projecting beyond the edge of the seat, a connecting-rod pivoted to the bottom of the vehicle and bearing an eye on its upper end which is designed to engage and fit over said socket, an elbow locking-lever pivoted to the said eye and having a ball on its short arm which is constructed to fit said socket when in locking position with the long arm of said lever lying between said parallel arms, substantially as described.

In testimony whereof I have hereunto set my hand in presence of two subscribing witnesses.

WALTER D. HOLLEY.

Witnesses:
JOHN A. FRIES,
ANDY G. WISSEL.